…

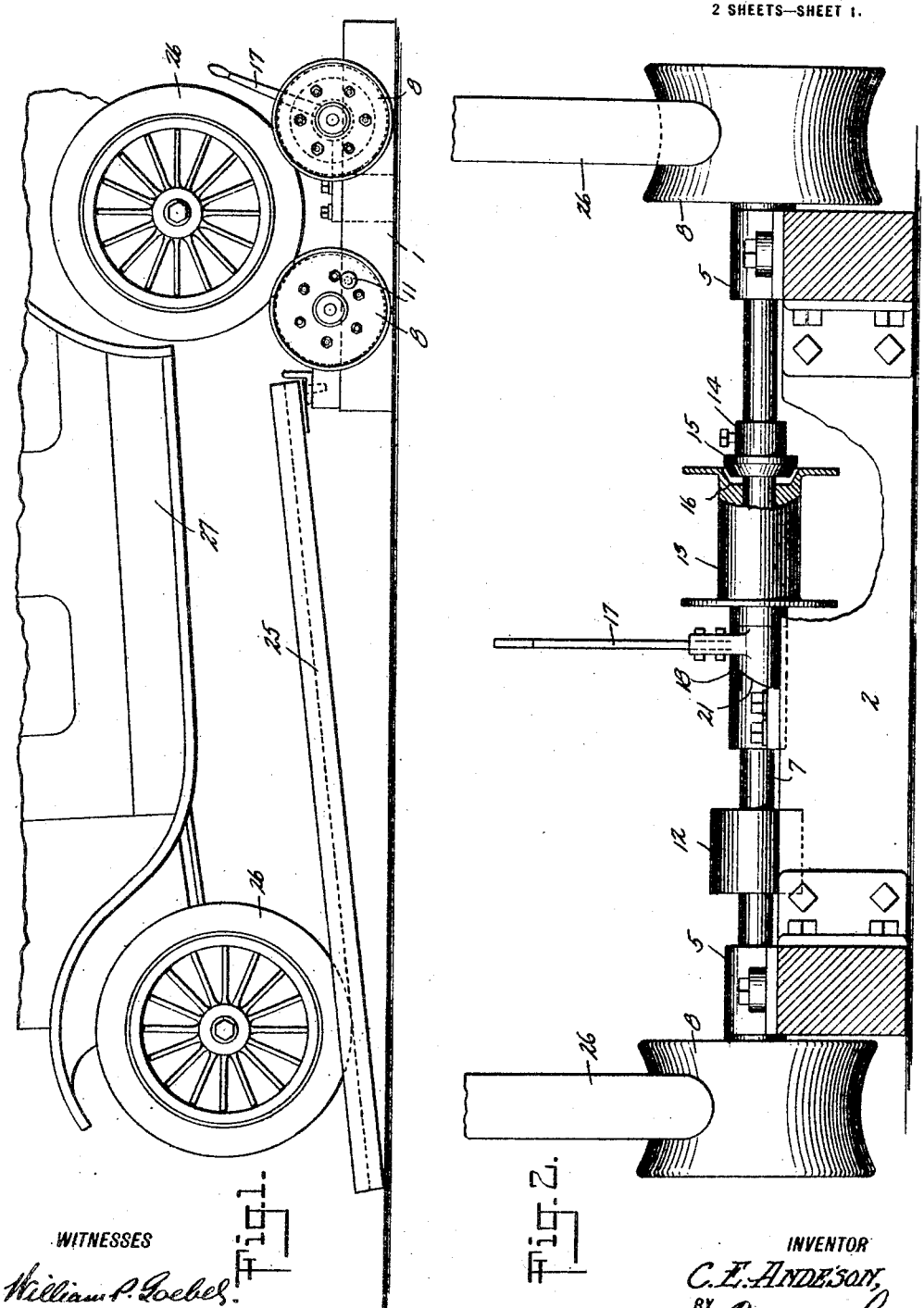

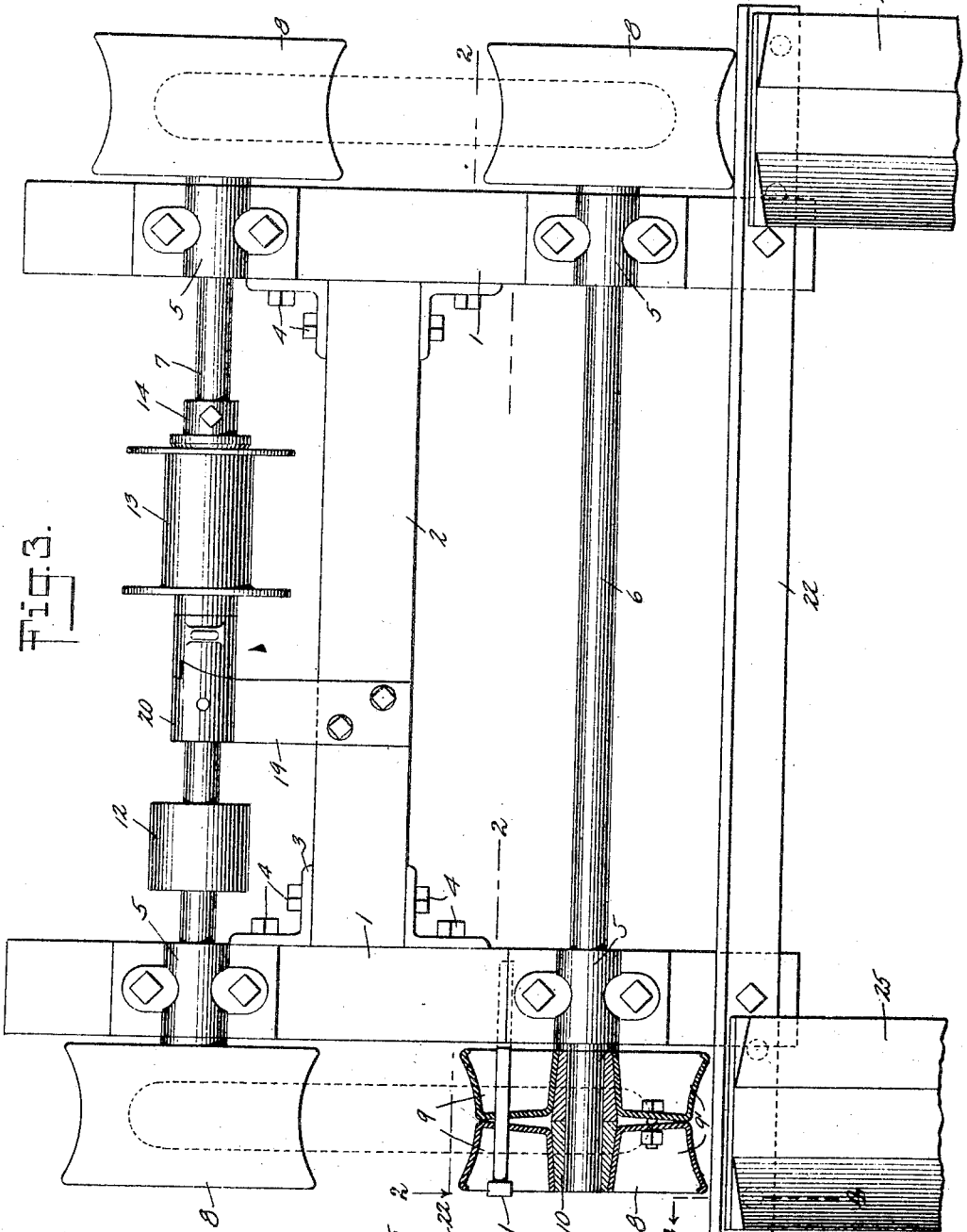

UNITED STATES PATENT OFFICE.

CLAUS EDWARD ANDERSON, OF SUPERIOR, WISCONSIN.

AUTO-TREADMILL.

1,393,600.  Specification of Letters Patent.  Patented Oct. 11, 1921.

Application filed April 10, 1920. Serial No. 372,799.

*To all whom it may concern:*

Be it known that I, CLAUS E. ANDERSON, a citizen of the United States, and a resident of Superior, in the county of Douglas and State of Wisconsin, have invented a new and Improved Auto-Treadmill, of which the following is a full, clear, and exact description.

This invention relates to improvements in auto treadmills, an object of the invention being to provide a treadmill on which an automobile can be conveniently run so as to position the drive wheels of the automobile in frictional engagement with pulleys for generating power which may be utilized for any desired purpose.

A further object is to provide a treadmill of the character stated which can be readily moved from place to place and which will utilize the motive power of an automobile for any ordinary work.

With these and other objects in view the invention consists in certain novel features of construction, and combinations and arrangements of parts, as will be more fully hereinafter described and pointed out in the claims.

In the accompanying drawings—

Figure 1 is a fragmentary view in side elevation illustrating my improved treadmill in operation.

Fig. 2 is a view in transverse section on the line 2—2 of Fig. 3.

Fig. 3 is a plan view partly in section.

Fig. 4 is a fragmentary view in section on the line 4—4 of Fig. 3.

My improved treadmill has a supporting frame or base composed of parallel side bars 1 and any desired number of transverse bars 2 rigidly secured to the side bars. I preferably employ angle brackets 3 and bolts or screws 4 to secure the bars together, but it is obvious that they may be secured in various other ways to effect a strong and rigid base.

Bearings 5 are provided on the side bars 1 and these bearings are arranged in pairs and support horizontal shafts 6 and 7 respectively which project beyond the base and have secured on their outer ends concave pulleys 8. These pulleys 8 may be made up of sheet metal sections 9 bolted together as shown at the lower left hand corner of Fig. 3, but, of course, my invention is not limited to the particular structure of pulley employed. The sections 9, above referred to, are secured about a hub 10 and the latter is fixed to the shaft in any approved manner to compel the shaft to turn with the pulley.

One of these pulleys 8 is provided with a transversely movable pin 11 which, when projected inwardly, will engage the side member 1 of the frame or base and prevent rotary movement of the pulley and shaft to which it is connected so that an automobile can be conveniently run onto the treadmill as will more fully hereinafter appear.

The shaft 7, which constitutes a driving shaft, is provided with a pulley 12 to operate a belt and is also provided with a drum 13 to operate a cable so that the improved treadmill may be used as a power transmitting means through the medium of either the pulley or the drum, or both, as may be desired.

The pulley 12 is fixed to the shaft 7 and the drum 13 is loose on the shaft 7. A fixed collar 14 on the shaft 7 carries a conical or tapering friction clutch member 15 which is adapted to engage in the recessed end 16 of the drum 13 when the latter is moved against the clutch member to frictionally hold the drum and shaft together.

The drum 13 is moved longitudinally of the shaft by means of a lever 17 and this lever is fixed to a sleeve 18 having rotary mounting on the shaft 7. A bracket 19 is fixed to the bar 2 and has a sleeve 20 at its free end receiving the shaft 7. The sleeves 18 and 20 have beveled or cam faces 21 so that when the lever 17 is turned in one direction, the partial rotary motion imparted to the sleeve 18 will, due to the engagement of the cam faces 21, force the drum 13 longitudinally of the shaft and into frictional engagement with the clutch member 15, thereby compelling the drum to turn with the shaft. When the lever is moved in the reverse direction, the drum will be released from frictional engagement so that the operator controlling the lever can instantly throw the drum into and out of frictional engagement with the clutch member 15.

An angle bar 22 is secured across the side bars 1, 1, and is provided with openings 23 for the reception of downwardly projecting pins 24 on inclines 25. These inclines 25 are preferably grooved or recessed in their upper faces and form guides to direct the wheels 26 of an automobile into position on the pulleys 8.

In operation, the automobile is backed up the inclines 25, the forward pair of pulleys 8 being first locked against movement by projecting the pin 11 over a bar 1 so that the pulleys will not turn and the rear drive wheels 26 of the automobile can ride over the same and move into position so that they are supported on the two pulleys 8 at the respective sides of the treadmill. When the automobile engine is driven, the wheels 26 thereof will frictionally transmit motion to the pulleys 8 to drive the shafts 6 and 7 and power can be taken off of the last-named shaft by means of the pulley 12 and the drum 13, as above explained.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. An auto treadmill, comprising a base, a pair of shafts having a rotary mounting in the base, pulleys fixed to the shafts and located outside of the base, an angle bar at one end of the base having its ends projecting beyond the sides of the base and having openings in its end portions, runways, pins on the under faces of the runways at one end adapted to be positioned in said openings and form inclined tracks to direct the wheels of an automobile onto said pulleys, and means for taking power from one of said shafts.

2. An auto treadmill, comprising a base, a pair of shafts having a rotary mounting in the base, pulleys fixed to the shafts and located outside of the base, an angle bar at one end of the base having its ends projecting beyond the sides of the base and having openings in its end portions, runways, pins on the under faces of the runways at one end adapted to be positioned in said openings and form inclined tracks to direct the wheels of an automobile onto said pulleys, means for taking power from one of said shafts, said base having an opening therein, and a pin in one of said pulleys adapted to be projected in said last-mentioned opening to hold one of said shafts and its pair of pulleys against turning movement while the automobile wheels are passing onto or off of the same.

CLAUS EDWARD ANDERSON.